Figure 1:
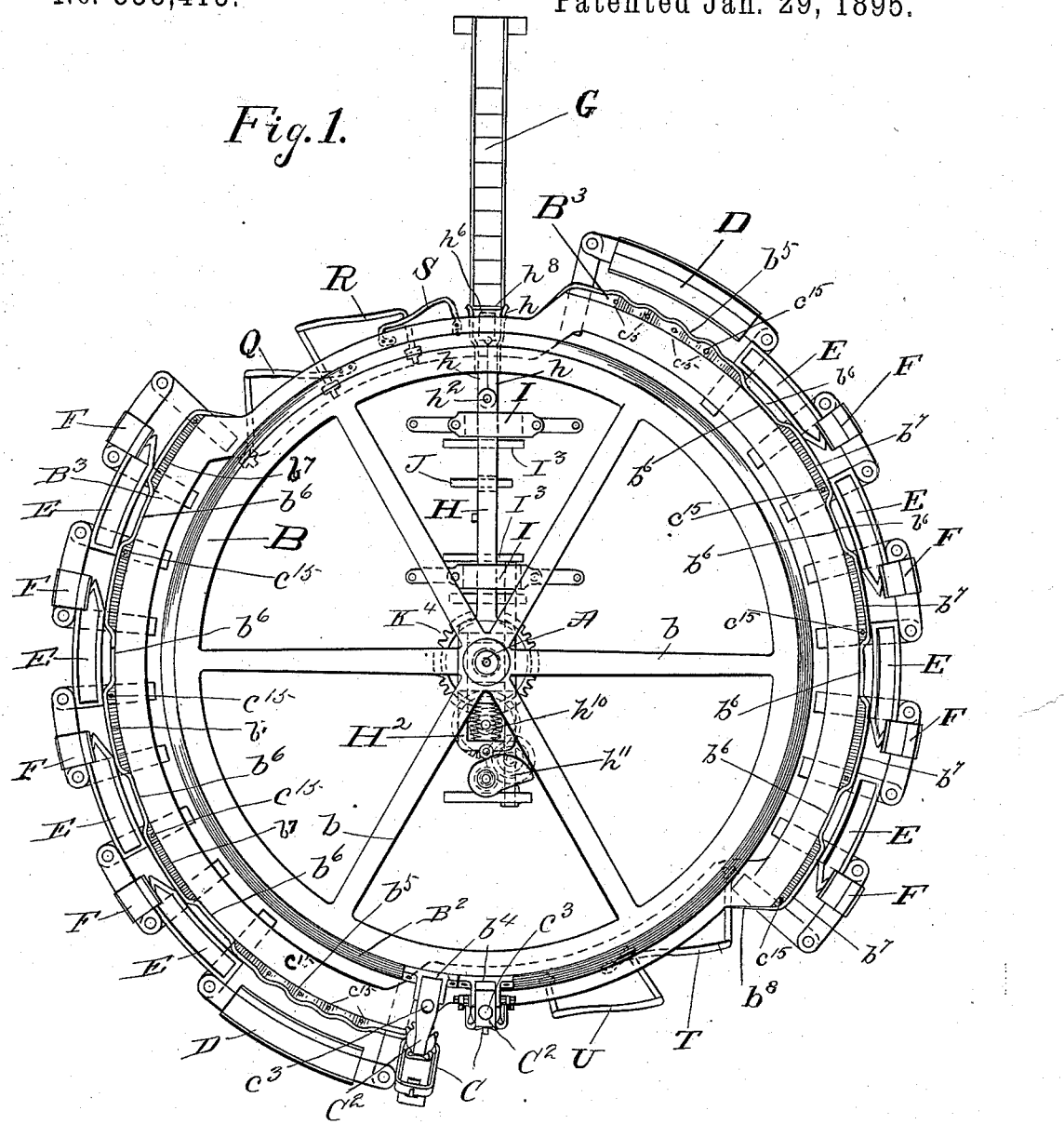

(No Model.)　　　　　　　　　　　　　　　　　　　5 Sheets—Sheet 1.
R. GREGG.
MACHINE FOR SOLDERING SHEET METAL CANS.

No. 533,415.　　　　　　　　　　Patented Jan. 29, 1895.

Witnesses:
David H. Mead.
R. Parry

Inventor
Robert Gregg.
By R. S. Dyrenforth,
Att'y (No Model.) 5 Sheets—Sheet 2.

R. GREGG.
MACHINE FOR SOLDERING SHEET METAL CANS.

No. 533,415. Patented Jan. 29, 1895.

Witnesses:
David H. Mead
C. H. Parry

Inventor:
Robert Gregg
By R. S. Dyrenforth,
Att'y

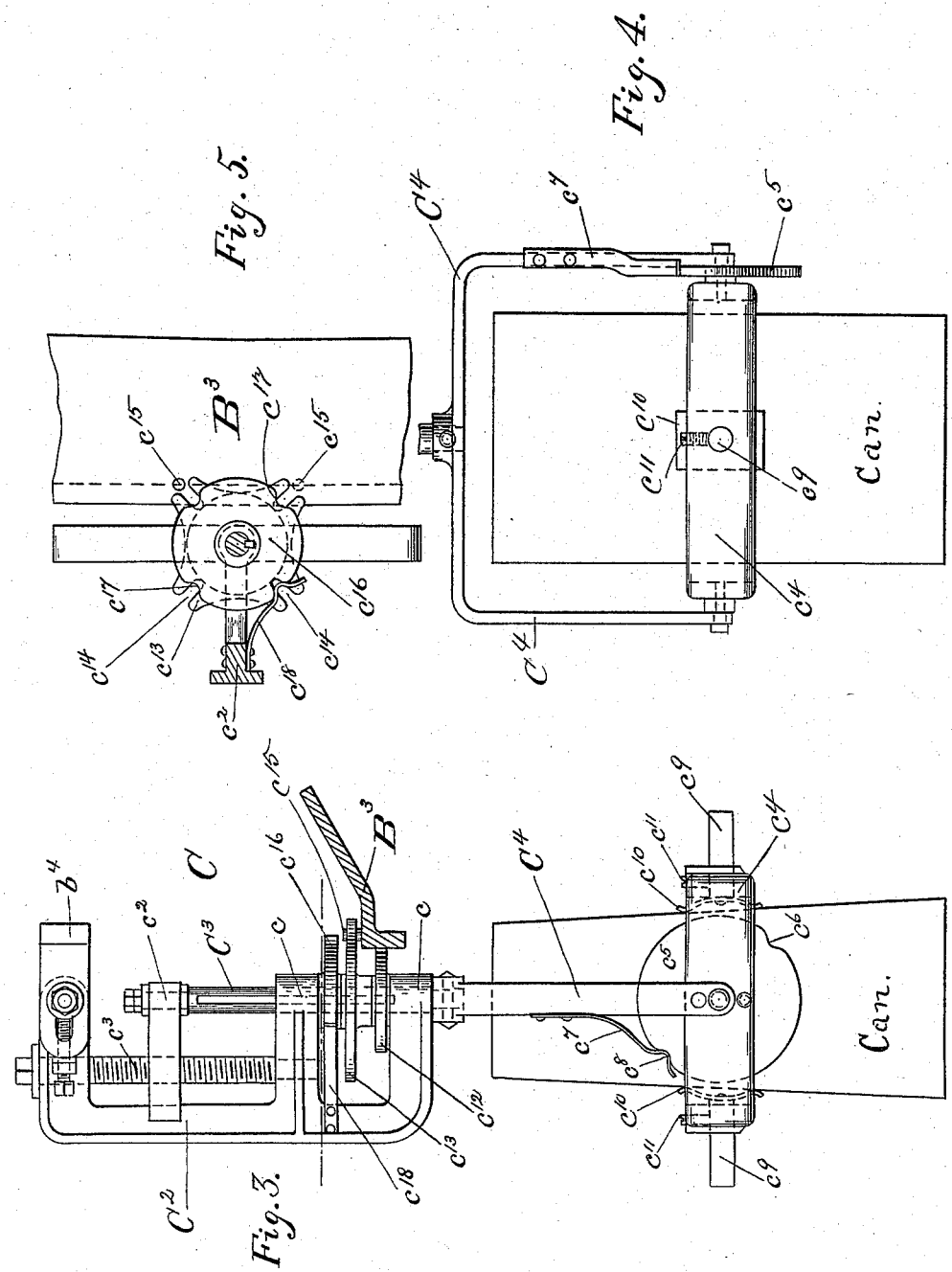

(No Model.) 5 Sheets—Sheet 4.
R. GREGG.
MACHINE FOR SOLDERING SHEET METAL CANS.
No. 533,415. Patented Jan. 29, 1895.
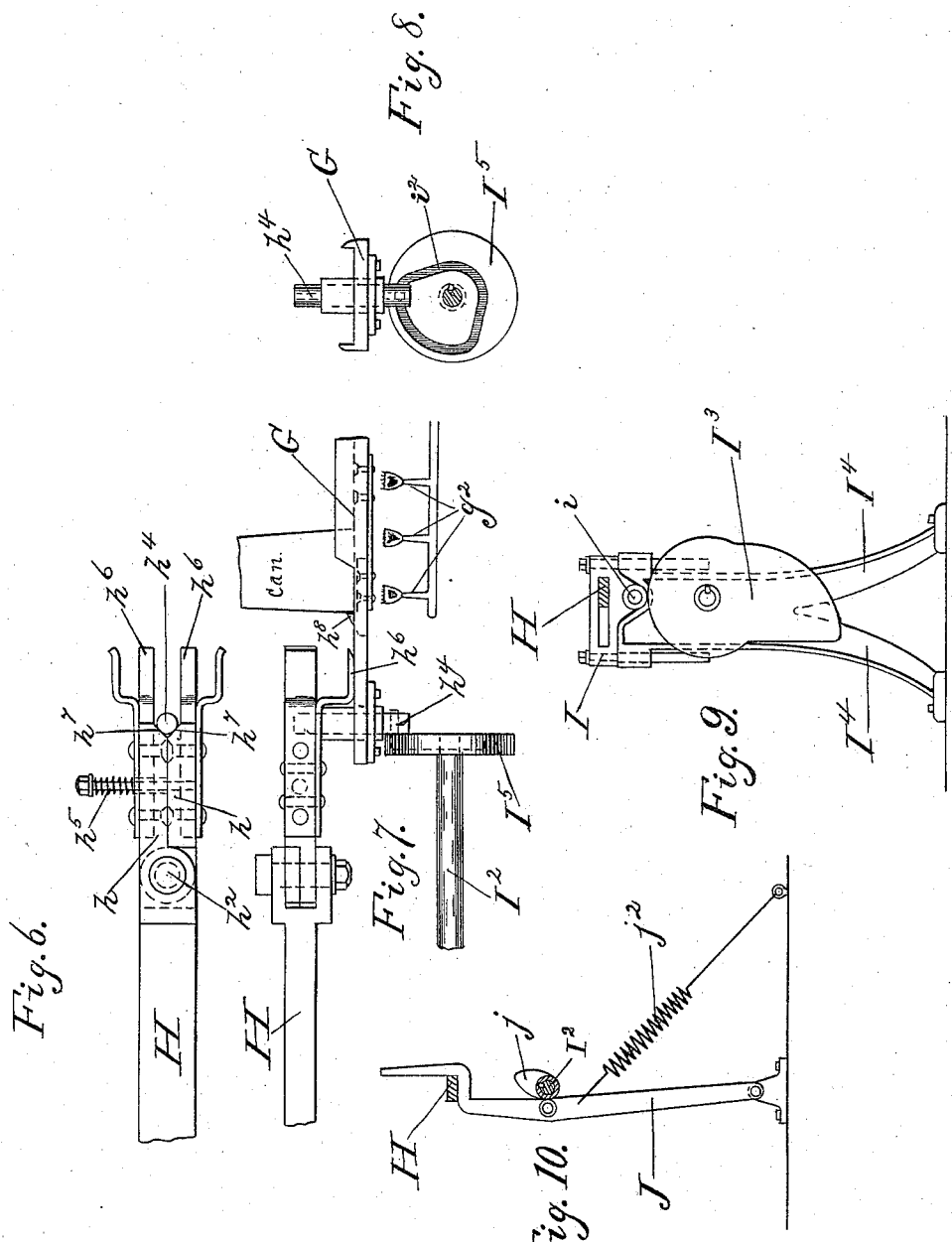
Witnesses:
Inventor:
Robert Gregg

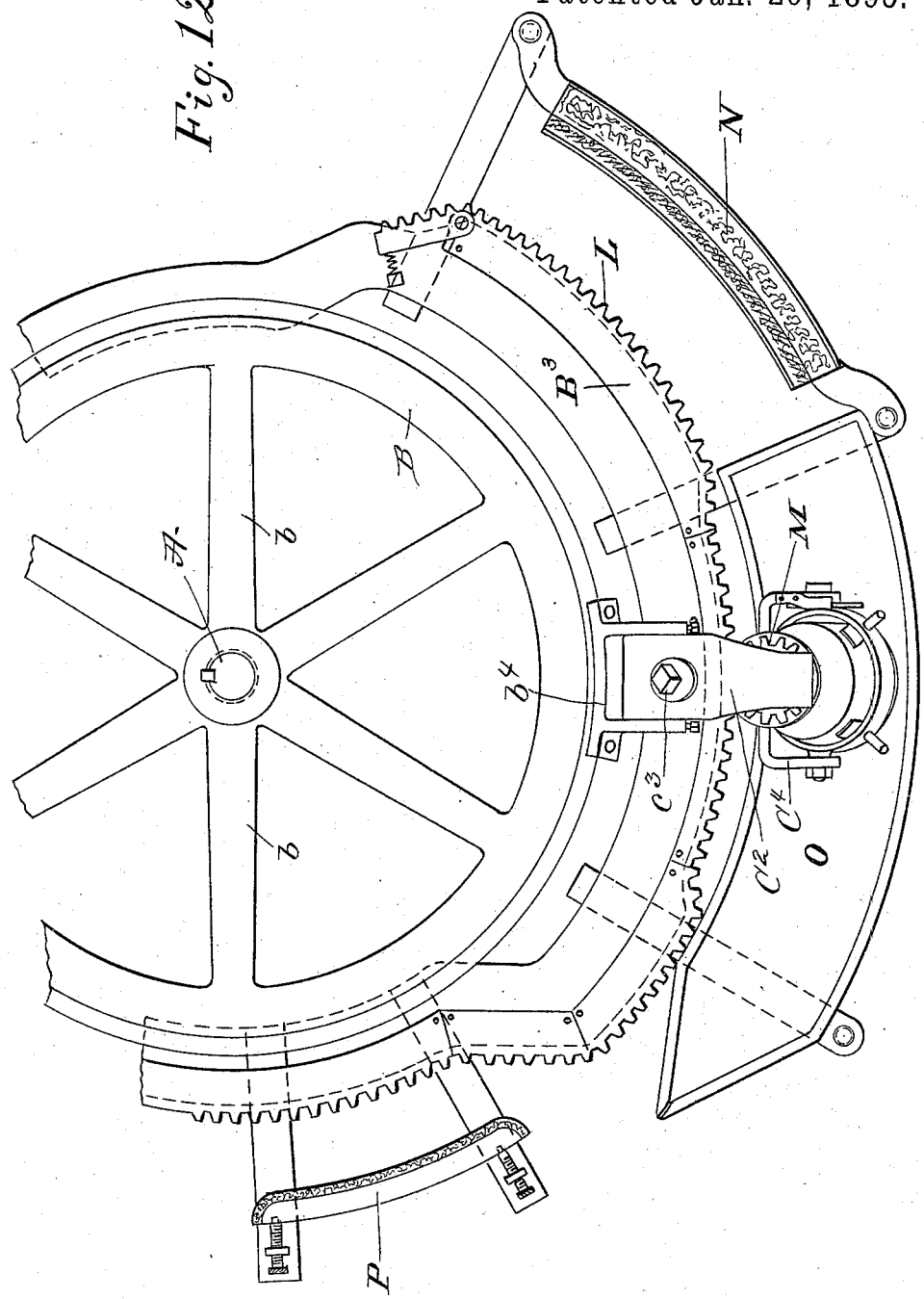

United States Patent Office.

ROBERT GREGG, OF CHICAGO, ILLINOIS, ASSIGNOR TO THE FAIRBANK CANNING COMPANY, OF SAME PLACE.

MACHINE FOR SOLDERING SHEET-METAL CANS.

SPECIFICATION forming part of Letters Patent No. 533,415, dated January 29, 1895.

Application filed September 19, 1893. Serial No. 485,863. (No model.)

*To all whom it may concern:*

Be it known that I, ROBERT GREGG, a citizen of the United States, residing at Chicago, in the county of Cook and State of Illinois, have invented certain new and useful Improvements in Machines for Manufacturing Sheet-Metal Cans; and I do hereby declare the following to be a full, clear, and exact description of the invention, such as will enable others skilled in the art to which it appertains to make and use the same.

This invention relates to the manufacture of sheet metal cans.

The object is to produce a machine in which both heads of a sheet-metal can may automatically be soldered to the body thereof; furthermore, to produce a machine in which a sheet-metal can will be engaged automatically while in a heated condition, then be bathed, at one end, in a suitable flux, and in solder, and have surplus solder wiped off, and, thereupon, be turned to bring the other end down, and then be bathed at this other end in flux, and in solder, and have the surplus solder wiped off, and, finally, be discharged from the machine.

With these objects in view, the invention consists, essentially, in a machine comprising a device by which cans are automatically taken or engaged, and carried, receptacles for flux and solder, and wipers for removing surplus solder, means for guiding the can-carrying device to bring the cans into contact with the flux, solder, and wipers, and a reversing device, by which, after one end of a can has been soldered, the can is turned to present the other end to flux, solder, and wipers; furthermore, in a machine in which both ends of a can may be soldered, comprising a heated feed-way by which cans to be soldered are kept hot and directed to the operative parts of the machine, a device by which the cans are taken, held, and carried, receptacles for flux and solder, wipers, means for guiding the can-holders to bring the cans into contact with the flux and solder and wipers, and a reversing-device, by which, after one end of a can has been soldered, the can will be turned to present the other end to flux, solder and wipers; furthermore, in a machine for soldering the ends of cans, comprising a heated guide-way where the cans are heated and directed to the operative parts of the machine, a can-holding device by which the cans are engaged and carried, a raising-device by which the cans are moved from the guide-way to the can-holding device, receptacles for flux and solder, wipers, a reversing-device, by which, after one end of a can is soldered, the can is turned to present the other end to flux, solder and wipers, and a discharging-device; furthermore, in a device for soldering both ends of a rectangular can, comprising an automatic clutching-mechanism, by which a can is engaged and by which it is carried, receptacles for flux and solder, and wipers by which surplus solder is removed, means for imparting partial revolutions to the clutching-devices, whereby all sides of an angular can are presented to the flux, solder and wipers, and a reversing-device, by which the can is turned, after one end is soldered, to present the other end to the flux, solder and wipers; and finally, the invention consists in various novel details of construction, by which the objects of the invention are attained, and the effective automatic operation of the machine is insured.

The invention is illustrated in the accompanying drawings, in which—

Figure 2:
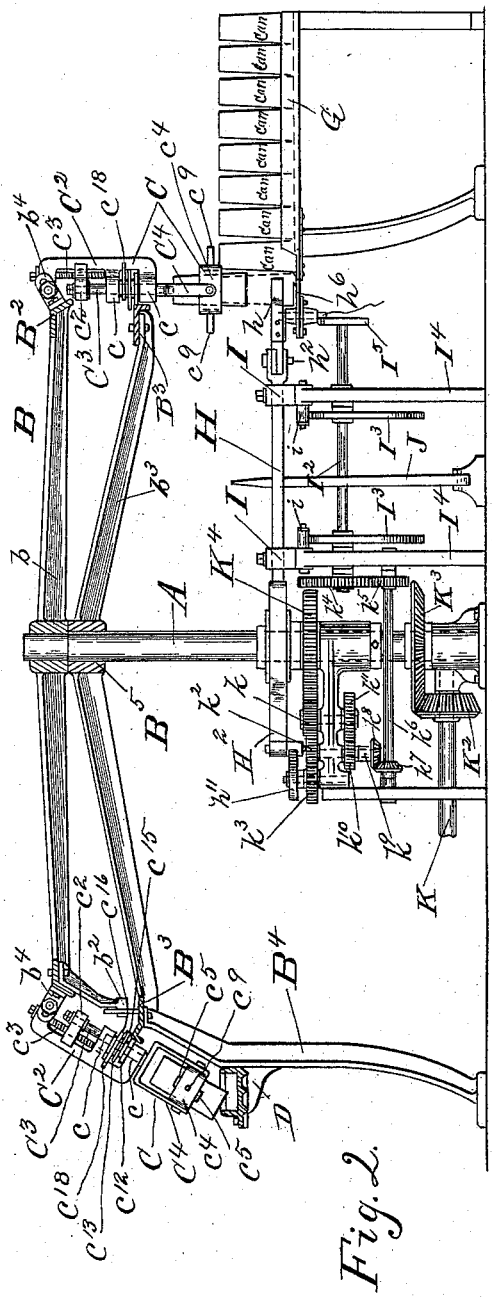
Figure 11:
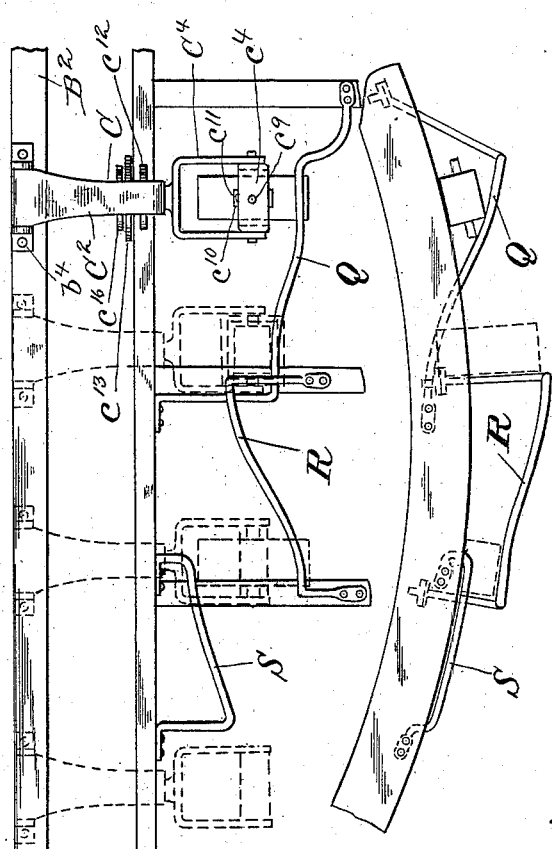

Figure 1— is a plan view of the machine, with all the can-holders except two removed. Fig. 2— is a side elevation of the machine, partly in section. Fig. 3— is a detail view, partly in section, of one of the can-holders. Fig. 4— is a detail view of a portion of the can-holder, showing the arrangement by which the reversing of the can is permitted. Fig. 5— is a fragmentary view, taken on the line *x—x* of Fig. 3, looking down, showing the means whereby the can-holder is given a partial revolution to present different sides of a rectangular can to flux, solder and wipers. Fig. 6— is a detail view of the gripping and raising device, whereby a can is engaged and introduced into a can-holder. Fig. 7— is a side elevation of the gripping and raising device. Fig. 8— is a detail view of a portion of the operating mechanism of the gripping and raising-device. Fig. 9— is a detail view of one of the cams and sliding-blocks for raising the gripping and raising device. Fig. 10— is a detail view of an arm by which the gripping and raising-device is given a short movement to carry the can, after being engaged and while it is being raised, in the direction in which the can-holder moves. Fig. 11— is a side elevation of the device for discharging the cans from the machine, and Fig. 12— is a plan view of a modified form of machine for use in soldering the heads upon round sheet-metal cans.

In the present embodiment of the invention, the principal moving and operating parts are disposed circularly around a central shaft, and the movements of the parts are in a circular direction. It will be obvious, however, upon a full understanding of the invention, that, by a modification, not changing the general idea of the machine, the parts may carry out their functions by advancing in a straight line, and returning to their initial positions after the completion of each operation.

In the drawings, A represents the main central shaft of the machine, upon which is located a wheel, B, having spokes, $b$, and a rim, $B^2$. The wheel, B, is supported at its outer edge by small rollers, $b^2$, bearing on a track, $B^3$. This track, $B^3$, is supported by the legs, $B^4$, and is rigidly secured to a hub, $B^5$, by the arms, $b^3$. Upon the rim, $B^2$, is mounted a suitable number of can-holders, C. In Fig. 2 of the drawings, two of these can-holders are shown in position. Each can-holder comprises a rectangular frame, $C^2$, pivotally connected at its upper end to a projection, $b^4$, from the rim, $B^2$, whereby the can-holder is allowed to swing toward and away from the rim. Each projection, $b^4$, is slotted, permitting the outward and inward adjustment of the can-holder relative to the main portion of the machine. Guided by lugs, $c, c$, on the frame is a stem, $C^3$, having attached, at its upper end, a projection, $c^2$, receiving a screw, $c^3$, mounted in the frame, whereby the position of the stem may be regulated. The lower end, $C^4$, of the stem, $C^3$, is forked, and, between the members of the fork is mounted a frame, $c^4$, which is of a shape corresponding to the contour of the can to be carried. This frame, $c^4$, is pivotally mounted in the fork, $C^4$, and attached to the frame, on one of its pivots, adjacent to one member of the fork, is a disk, $c^5$, provided with notches, $c^6$, in its circumference. A spring, $c^7$, is attached to the same member of the fork and has a bent portion, $c^8$, which engages the notches, $c^6$, on the disk, $c^5$, and retains the frame, $c^4$ in one of two positions to which it may be turned. At the sides of the frame, $c^4$, are pins, $c^9$, which project through the frame and have attached to their inner ends spring-plates, $c^{10}$, which are designed to bear against the can-body and retain the same in position by frictional contact. Set-screws, $c^{11}$, project through the frame, $c^4$, and bear upon the pins, $c^9$. These set-screws serve to hold the pins in any position to which they may be moved to adapt the holder for different sized cans. Each of the can-holders is provided with a wheel or roller, $c^{12}$, mounted on the stem, $C^3$, and bearing against the track, $B^3$, so that any depression or projection on the face of the rim will cause a movement inward and outward of the can-holders as they pass around the rim.

The machine, as illustrated, for example, in the first six figures of the drawings, is designed particularly for use in soldering cans which are angular in cross-section, and in order to turn the holders to present the different sides of the cans carried thereby to flux, solder, wipers, &c., the mechanism now to be described is employed.

The stem, $C^3$, of each can-holder has attached to it, a plate, $c^{13}$, which is provided, on its edge, with notches, or indentations, $c^{14}$, of a number corresponding to the number of sides of the can to be soldered. Placed upon the track $B^3$, is a number of pins, $c^{15}$, arranged such a distance from the edge of the track as to enter the notches, $c^{14}$, in the plates, $c^{13}$, as the can-holders move along the track. The can-holder, in its movement, during the operation of the machine, presents the plate to these pins at proper intervals to turn the can-holder and, consequently, the can, to present new surfaces to flux, solder, or wipers. Arranged adjacent to the plate, $c^{13}$, is a disk, $c^{16}$, provided, on its periphery, with a number of indentations, $c^{17}$, to be engaged by a spring, $c^{18}$, attached to the frame, $C^2$, of the can-holder. This disk, $c^{16}$, is keyed or otherwise secured to the stem, $C^3$, so that the stem and parts attached thereto will be retained in any position to which it may be turned.

The track $B^3$ is approximately circular in form and is provided with projections and indentations, $b^5, b^6, b^7$, as shown in Fig. 1 of the drawings, for raising and lowering the can-holder and the can carried thereby, into and out of contact with fluxes, soldering-pots, &c.

Contiguously arranged with reference to the track, $B^3$, is a suitable number of troughs, D, which contain any suitable flux or lamp-wicks, pieces of felt, or similar absorbent material saturated with oil, and at the position of these troughs are the projections, $b^5$, which swing out or raise the can-holders and bring the edges of the cans into the fluxing-troughs. Here, also, are arranged the pins, $c^{15}$, by which the can-holders are rotated in order to bring different faces of a can into contact with the flux.

A short distance in advance of each trough, D, that is, in the direction of the movement of the can-holders, is a number of sets of soldering-pots or troughs, E, and, at the position of these, are the depressions, $b^6$, which allow the can-holders to swing down or drop and to bring the edges of the cans into the soldering-troughs. The contents of the soldering-troughs are kept in a fluid state in any suitable manner, as by the use of gas-jets or other heating medium arranged below them. At a point in advance of each depression, $b^6$, a pin, $c^{15}$, engages one of the indentations, $c^{14}$, in the disk, $c^{13}$, and the can-holder and can contained therein are given a partial turn to present a new side of the can to the solder as the can is dropped into the successive soldering-pots. At the end of each soldering-trough is arranged a wiper, F, of felt or the like, whereby the edge of the can recently dipped in the solder is brushed along the wiper and surplus solder removed; and, at the position of the wipers are the projections, $b^7$, which swing out or raise the can-holders to bring the edges of the cans against the wipers.

The number of soldering-pots corresponds to the number of sides which the can has.

Under the arrangement above described, and shown as a mere illustration, the operation is on cans having four sides; and it will be obvious that the machine may be arranged to operate upon cans having any number of sides.

The means whereby the cans are introduced into the machine and placed in the can-holder will now be described.

Adjacent to the working parts of the machine is a channel or guide-way, G, into which the cans to be soldered are introduced. This channel or guide-way is heated, as by gas-jets, $g^2$, arranged beneath it, or otherwise, in order that the cans as they are fed into the machine, may become heated and be thereby adapted to take and retain solder. The cans may be fed into the machine by hand or by suitable mechanical means. As the can to be soldered comes into line with one of the can-holders, it is raised into the same by the mechanism now to be described.

An arm, H, extends from the center of the machine to a point approximately beneath the periphery of the wheel, B, and the outer end of this arm is provided with two fingers, $h$, $h$, pivotally hinged at the point, $h^2$. The fingers, $h$, and the fingers, $h^6$, form a socket in which the can to be fed into the can-holder is received. The arm H is first given an outward movement to engage the can, then a retracting movement to bring the can below the can-holder, and then an upward movement to force the can into the can-holder. The inner faces of the fingers, $h$, are beveled at a point, $h^7$, and a pin, $h^4$, is arranged on a guide-way in such position as to engage the beveled portion, as the arm H is forced outward. The pin coming into contact with the beveled portion, separates the fingers, $h$, to allow them to receive the can; while, when the fingers have surrounded the can to be engaged, the pin, $h^4$, is withdrawn, allowing the coil-spring, $h^5$, to force the arms together and thereby engage the can, all by means of a disk $I^5$, having a cam-groove, $i^2$, which receives a projection from the pin, $h^4$, as will be described farther on. The lower fingers, $h^6$, as they move outward to engage the can, press down a hook or catch, $h^8$, in the guide-way, G, thus allowing a can to come forward when grasped by the fingers. As the can is removed, the catch is moved upward to prevent the feeding of other cans until the proper time, when the catch is again depressed by the forward movement of the finger. The catch is beveled on its upward and inner face, facilitating its depression by the fingers, $h^6$, as they move outward.

The mechanism by which the movements are imparted to the arm, H, and its appurtenances, will now be described. The inner end of the arm, H, is provided with a yoke, $H^2$, and, in this yoke, is arranged a spring, $h^{10}$, one end bearing against a stationary part of the machine, and the other against the yoke, the tendency of the spring being to force the arm, H, inward. At the extreme inner end of the yoke is a bowl or roller, and against this bowl or roller, bears the cam, $h^{11}$, the function of which is to give the arm H an intermittent forward movement. The arm, H, is held in two slotted blocks, I, I, upon which are arranged the bowls or rollers, $i$, $i$. The blocks are arranged to have an up-and-down movement in the upper end of standards, $I^4$, $I^4$. A shaft $I^2$ is arranged below the arm, H, and, on this shaft are placed two cams, $I^3$, $I^3$, so arranged on the shaft as to be in contact with the bowls or rollers, $i$, $i$. The shaft is rotated in a suitable way, and the movement is so timed, that it acts through the cams, $I^3$, $I^3$, to raise the arm, H, and the fingers attached thereto at the time when the can is in a position beneath the can-holder and ready to be raised to a position therein.

To insure the perfect placing of the can in the can-holder, after being raised by the arm, H, an arm, J, shown in Fig. 10 of the drawings, which is preferably located between the two cams, $I^3$, $I^3$, is given a movement in the direction in which the can-holder is moved by a cam $j$ on the shaft, $I^2$, and is returned from such movement by spring $j^2$. The function of this arm, J, is to push the arm, H, a short distance forward in the direction in which the can-holder is moved, at the time when the cans are introduced into the holders, thus avoiding danger of injury to the machinery, which might arise by reason of introducing a can into a moving can-holder from a stationary raising device. At the end of the shaft, $I^2$, is fixed a disk, $I^5$, having formed in its face an eccentric-groove, $i^2$, which receives a projection from the pin, $h^4$, by which the separation of the fingers, $h$, to receive the can-body is effected. This disk $I^5$ serves to withdraw the pin from between the fingers at the time when the fingers are about to engage the can. After one end of a can-body has been successively fluxed, soldered and wiped, the can-body is allowed to cool, and is then reversed to bring the end of the can formerly uppermost, down, to allow it to receive treatment in a manner similar to that received by the other end. To accomplish this, a deep depression, $b^8$, is formed in the track, $B^3$, which, allowing the can-holders as they come opposite it, to fall to a vertical position, also causes the solder to spread evenly and prevents it from running chiefly to one place or another, and harden in clots. This arrangement in the machine, whereby cans come into vertical position after leaving the solder, is of the highest importance, practically. While moving along in a vertical position, the can comes into contact with the arm T, which projects into its path and is so arranged and shaped, as to press against the lower portion of the can and cause that end to swing inward until the can is in a horizontal position, having described a quarter of a circle. Then the arm, U, similarly formed and arranged, engages the other end of the can and presses it downward until the can again assumes an upright position, having been completely inverted. In this way, the opposite end of the can to that already treated is brought into proper position to be presented to the flux, solder and wipers, held in a second series of receptacles similar to those above described.

The cans are automatically discharged from the machine after being brought into contact with the second set of flux and solder-receptacles, by the rods, Q, R, and S, which are arranged in the path of the can-holders a short distance in advance of the point at which the cans are introduced into the machine.

The rod, Q, is attached to the frame of the machine and the face which comes into contact with the cans is, in its general form, inclined from its front to its rear end, and it is bent inward from its front to its rear end, so that, as the cans come into contact with it, they are given a quarter-revolution, bringing them into a horizontal position. The rod, R, is also attached to the frame of the machine and is bent downward and inward. The outer end of the can comes into contact with the rod, S, and is, by it, forced downward and inward and thus is given a quarter-revolution. From this, it will be seen that the can is turned to assume the position which it had when it was introduced into the holder.

The rod, S, is so arranged as to come into contact with the upper end of the can, and, as it inclines downward from its forward to its rear end, the can, as it passes along, will be forced out of the holder into a suitable receptacle below.

In Fig. 12 of the drawings, I have illustrated a modified form of machine whereby the floating or soldering of both ends of a cylindrical tronconical, ronyon, or other shaped cylindrical or approximately cylindrical can may be effected. In this form of apparatus, the track, $B^3$, is provided, on its periphery, with a rack, L, and a pinion, M, is mounted on the spindle of the can-holder. By the rack and pinion, the can-body, held in the can-holder is given a rotary movement through its entire passage around the track, thus insuring contact of all portions of each end with the flux, and solder. In the modified form, the receptacle, N, for flux is elongated, and provided for the reception and retention of the can-body during the several rotations. The solder-receptacle, O, is also elongated, as shown, while the wiper, P, is brought into contact with the can-body after the same is removed from the solder-receptacle and is dropped into a vertical position for cooling.

Motion is imparted to the machine through a driving-shaft, K, having, at its end, a bevel gear-wheel, $K^2$. A bevel gear, $K^3$, is keyed or otherwise secured to the main shaft, A, of the machine, and meshes with the bevel-gear, $K^2$. Mounted on the shaft, A, above the wheel, $K^3$, is a gear-wheel, $K^4$, which, through gears, $k$ and $k^2$, and $k^3$, communicates motion to the cam, $h^{11}$, the gears being of such size as to cause a revolution of the cam once for each can-holder employed on the machine.

The shaft, $I^2$, is operated through the gears, $k^4$, $k^5$, and shaft, $k^6$, bevel-gear, $k^7$, bevel-gear, $k^8$, shaft, $k^9$, and the gears, $k^{10}$ and $k^{11}$.

In operating the machine, the can-bodies or cylinders are placed in the channel or guideway, G, so as to be first heated, and then they are carried along until the inner can rests against the catch, $h^8$. The first can remains in position against this catch until engaged by the raising-device formed by the arm, H, having the fingered ends. The arm, H, is moved outward from its normal position to a place where its fingers surround the can-body. The wheel, B, carrying the can-holders, is given a continuous rotary movement and the operation of the machine is so timed, that the arm, H, after engaging the can-body, is retracted and raised at the exact instant when a can-holder is in position over the arm, H. In order to prevent danger of injury to the machine by introducing a can-body from the raising-device into the moving can-holder, the arm, J, is operated to move the arm, H, a short distance in the direction in which the can-holders move. After a can has been introduced in a can-holder, the holder continues to move in the same direction, and it is guided inward and outward from the wheel, B, by the track, $B^3$. As a can-holder passes along that portion of the track opposite the flux-receptacle, D, the can is given a series of in-and-out movements, and is, at the same time, turned on its vertical axis, the result of these movements being to bring all sides of the can alternately into contact with the flux and to raise the can from the flux during the act of turning to present a new side. As the can-holder passes from the flux-receptacle, it is lowered into one of the solder-receptacles, E, and, as it progresses and is carried along through this receptacle, and just before it reaches the end thereof, the holder is raised by the wheel, $c^{12}$, riding out of the adjacent indentations, $b^6$, of the track, $B^3$, thus bringing the can into contact with one of the wipers, F. Just before entering each of the solder-receptacles, E, the can is given a partial rotation, and the operation of being immersed in solder and raised from the solder-receptacle into contact with the wipers, and turning of the can on its vertical axis, takes place a number of times corresponding to the number of sides of the can operated upon. After passing through the portion of its travel occupied by the solder-receptacles and wipers, the can is dropped into a vertical position where it is allowed to cool, by reason of falling into the depression, $b^8$, of the track. During the latter part of the travel of the can along this depressed portion of the track, it is engaged by turning-devices and given a partial revolution on its horizontal axis, thus presenting, downward, to the successive flux and solder-receptacles and wipers, the end which was uppermost when the can-body was introduced into the machine. After being reversed, the can-body is brought into contact with the second series of flux and solder-receptacles and wipers, and, after passing through them, the can-body is again reversed and discharged from the machine into a suitable receptacle.

Having thus described my invention, what I claim, and desire to secure by Letters Patent, is—

1. A machine for soldering the heads on cans, comprising a carrying-device by which the cans are progressively moved forward, automatic means for forcing the headed cans endwise into engagement within the carrier, receptacles for flux, receptacles for solder, and means for guiding the can-carrying device to bring the cans into contact with the flux and solder, substantially as described.

2. A can-soldering machine comprising automatic means by which the cans are taken and carried, means for operating the same, and supplemental or adjunctive mechanism by which the can-carrying device, immediately upon taking the can, is pushed a short distance onward in the direction in which the can-holder is moved, substantially as and for the purpose described.

3. A machine for soldering the heads on cans, comprising a carrying-device by which the cans are progressively moved forward, automatic means for forcing the headed cans endwise into engagement with the carrier, receptacles for flux, receptacles for solder, wipers, and means for guiding the can-carrying device to bring the cans into contact with the flux, solder, and wipers, substantially as described.

4. A machine for soldering the heads on cans, comprising a carrying device, progressively moved forward, means for feeding the cans into alignment with the carrying device, mechanism for automatically forcing the headed cans into engagement within the carrier, receptacles for flux, receptacles for solder, and means for guiding the can-carrying device to bring the cans into contact with the flux and solder, substantially as described.

5. In a machine for soldering the heads on cans, the combination with a rotatable support, of can-carrying holders mounted upon the support, means for automatically feeding the cans into alignment with the carrier, and mechanism for forcing the headed cans endwise into engagement with the carrying device, substantially as described.

6. A machine for soldering the heads on cans, comprising a carrying-device by which the cans are progressively moved forward, automatic means for forcing the headed cans endwise into engagement within the carrier, receptacles for flux, receptacles for solder, and means for guiding the can-carrying device to bring the cans to the receptacles, substantially as described.

7. In a can-soldering machine, the combination with a movable support, of can-carrying holders mounted upon the support and normally retained at an angle therewith, means for applying solder while the cans are in an inclined position, and a device by which the cans are caused to assume a vertical position after the application of the solder, whereby the solder is prevented from running and forming into clots and will harden evenly, substantially as described.

8. A can-soldering machine, comprising a carrying-device by which the cans are progressively moved forward, automatic means for forcing the headed cans endwise into engagement within the carrier, receptacles for flux, receptacles for solder, means for guiding the can-carrying device to bring its can into the receptacles, and a reversing device, substantially as described.

9. In a can-soldering machine, the combination with a rotatable support, of can-carrying holders adjustably mounted upon the support and normally retained in an inclined position, means for rotating and oscillating the holders independently of the support, and a reversing-device by which the holders are periodically inverted, as and for the purpose specified.

10. In a machine for soldering cans, the combination with a heated guide-way, by which the cans are directed to the operative parts of the machine, of a rotatable support provided with can-carrying holders mechanism for forcing the headed cans endwise into engagement with these holders, receptacles for flux and for solder, one or more wipers, and means for guiding and reversing the cans to present both ends to the flux, solder, and wipers, substantially as described.

11. A can-soldering machine, comprising a carrying-device by which the cans are progressively moved forward, automatic means for forcing the headed cans endwise into engagement within the carrier, receptacles for flux, receptacles for solder, means for guiding the can-carrying device to bring the cans into contact with the flux and solder, and an automatic device discharging the headed cans, substantially as described.

12. In a machine for soldering cans, the combination with a heated guideway, of means for automatically feeding the cans, one by one, and directing them to the operative parts of the machine, can-carrying holders by which the cans are automatically engaged, a raising device by which the cans are transferred from the guideway to the holders receptacles for flux, and for solder, one or more wipers, means for guiding and reversing the holders to present both ends of the cans to the flux, solder, and wipers, and a discharging-device by which the cans are disengaged from the holders, substantially as described.

13. In a can-soldering machine, the combination with a rigid support mounted to rotate continuously, of angularly disposed can-carrying holders mounted upon the support, automatic means for forcing the cans endwise into engagement within the holders, and means for imparting rotary and oscillatory motion to the holders, substantially as described.

14. A machine for soldering the ends of cans, comprising a circular series of can-carrying holders, automatic means for directing the cans to and forcing them endwise into the holders, a track provided with depressions and elevations over which the can-holders pass, and receptacles for flux and for solder, and wipers, arranged substantially as described.

15. A can-carrying holder, comprising a stem provided with forked arms, a frame supported by the arms and spring-plates adjustably secured in the frame, whereby the distance between the plates may be varied to adapt the holders to cans of different size and to increase or decrease the tension upon the can, substantially as described.

16. In a machine for soldering the ends of cans, the can-holders having the stems, the notched plates attached to the stems, the guideway by which the can-holders are guided, and the pins on the guideway, engaging the notches in the disks, substantially as described.

17. In a machine for soldering the ends of cans, the can holders having the stems, the notched plates attached to the stems, the indented disk, springs engaging the indentations in the disk, and the guideway provided with pins entering the notches in the plates, substantially as described.

18. In a machine for soldering the ends of cans, the holders provided with rollers, the notched plates, the guideway provided with pins, the receptacles for flux and for solder, and the wipers, substantially as described.

19. In a machine of the class described, a can-holder comprising a frame, a spindle revolubly and adjustably mounted in the frame and provided with a terminal yoke, adjustable automatic can-gripping devices trunnioned in the yoke and means for retaining the gripping-devices in operative position, as specified.

20. In a machine of the class described, the combination with a stationary track provided with a series of upright and also lateral projections and indentations, of a frame rotatably mounted upon the track, a plurality of can-carrying holders pivotally secured to and moving with the frame and provided, respectively, with a series of rollers or disks adapted to engage the projections and indentations of the track, and thereby impart rotary and oscillatory motion to the holders, as specified.

In testimony whereof I affix my signature in presence of two witnesses.

ROBERT GREGG.

Witnesses:
RUDOLPH WOLFNER,
CHAS. J. HOLTER.